US012203703B2

(12) United States Patent
Stewart

(10) Patent No.: US 12,203,703 B2
(45) Date of Patent: Jan. 21, 2025

(54) LIQUID REMOVAL DEVICE WITH ABSORBER DRUM AND RELATED METHODS

(71) Applicant: Clevertivity LLC, Ponte Vedra Beach, FL (US)

(72) Inventor: Justin Stewart, Ponte Vedra, FL (US)

(73) Assignee: Clevertivity LLC, Ponte Vedra Beach, FL (US)

( * ) Notice: Subject to any disclaimer, the term of this patent is extended or adjusted under 35 U.S.C. 154(b) by 0 days.

(21) Appl. No.: 18/581,905

(22) Filed: Feb. 20, 2024

(65) Prior Publication Data

US 2024/0191946 A1 Jun. 13, 2024

Related U.S. Application Data

(63) Continuation of application No. 18/226,620, filed on Jul. 26, 2023, which is a continuation of application No. 18/109,072, filed on Feb. 13, 2023, now Pat. No. 11,747,083, which is a continuation of application No. 17/375,673, filed on Jul. 14, 2021, now Pat. No. 11,609,044.

(60) Provisional application No. 63/214,402, filed on Jun. 24, 2021, provisional application No. 63/164,062, (Continued)

(51) Int. Cl.
*F26B 5/16* (2006.01)
*F26B 9/00* (2006.01)
*F26B 25/16* (2006.01)

(52) U.S. Cl.
CPC ................ *F26B 5/16* (2013.01); *F26B 9/003* (2013.01); *F26B 25/16* (2013.01)

(58) Field of Classification Search
CPC ............. F26B 5/16; F26B 9/003; F26B 25/16
USPC ........................................................... 34/355
See application file for complete search history.

(56) References Cited

U.S. PATENT DOCUMENTS 3,079,620 A * 3/1963 Hunter .................... E01H 1/108 405/36
3,789,449 A * 2/1974 MacFarland .......... A47L 11/292 15/52

(Continued)

FOREIGN PATENT DOCUMENTS

DE 2164252 A1 * 6/1973
GB 742264 A * 12/1955
JP 04139376 A * 5/1992

*Primary Examiner* — Stephen M Gravini
(74) *Attorney, Agent, or Firm* — Frost Brown Todd LLP; Vance V. VanDrake, III; Alexander J. Johnson

(57) ABSTRACT

A liquid removal device is for removing a liquid from a surface. The liquid removal device includes a chassis comprising a handle and an absorber drum and an extractor drum both rotationally coupled with the chassis. The absorber drum includes a cylinder, where an absorbent layer is positioned on an outer drum surface of the absorber drum. The extractor drum includes a reservoir configured to retain the liquid absorbed from the surface, an outer extractor surface, and a plurality of apertures defined by the outer extractor surface in fluid communication with the reservoir. The extractor drum is movable between a first position and a second position. In the first position, at least a first portion of the plurality of apertures are in contact with the absorbent layer. In the second position, the first portion of the plurality of apertures are not in contact with the absorbent layer.

20 Claims, 8 Drawing Sheets

Related U.S. Application Data filed on Mar. 22, 2021, provisional application No. 63/051,439, filed on Jul. 14, 2020.

(56) References Cited

U.S. PATENT DOCUMENTS

| | | | | | |
|---|---|---|---|---|---|
| 4,879,820 | A * | 11/1989 | Mclaughlin | E01H 1/108 34/95.3 |
| 4,989,293 | A * | 2/1991 | Bashyam | A47L 11/292 15/97.1 |
| 5,115,579 | A * | 5/1992 | Pappas | E01H 1/108 34/95.3 |
| 6,629,333 | B2 * | 10/2003 | Bolden | A47L 11/4041 15/401 |
| 11,609,044 | B2 * | 3/2023 | Stewart | F26B 25/16 |
| 11,747,083 | B2 * | 9/2023 | Stewart | E01H 1/108 34/355 |
| 11,859,904 | B2 * | 1/2024 | Stewart | F26B 5/16 |
| 2021/0085148 | A1 * | 3/2021 | Hopkins | A47L 11/4047 |
| 2024/0035748 | A1 * | 2/2024 | Stewart | E01H 1/108 |
| 2024/0191946 | A1 * | 6/2024 | Stewart | F26B 9/003 |
| 2024/0191947 | A1 * | 6/2024 | Stewart | F26B 9/003 |

* cited by examiner

LIQUID REMOVAL DEVICE WITH ABSORBER DRUM AND RELATED METHODS

CROSS REFERENCE TO RELATED APPLICATIONS

This application is a continuation application of U.S. patent application Ser. No. 18/226,620, filed Jul. 26, 2023, which is a continuation of U.S. patent application Ser. No. 18/109,072, filed Feb. 13, 2023, now U.S. Pat. No. 11,747,083, issued Sep. 5, 2023, which is a continuation of U.S. patent application Ser. No. 17/375,673, filed Jul. 14, 2021, now U.S. Pat. No. 11,609,044, issued Mar. 21, 2023, which claims the priority benefit of U.S. Provisional Patent Application No. 63/214,402, filed Jun. 24, 2021, U.S. Provisional Patent Application No. 63/164,062, filed Mar. 22, 2021, and U.S. Provisional Patent Application No. 63/051,439, filed Jul. 14, 2020, each of which is hereby incorporated herein by reference in its entirety.

TECHNICAL FIELD

The present disclosure relates to the field of liquid removal devices, and, more particularly, to a liquid removal device for a surface and related methods.

BACKGROUND

A need exists for improved devices and methods for drying a surface, such as an athletic court.

SUMMARY

Generally, a liquid removal device is for removing liquids from a surface. The liquid removal device may include an absorber drum to roll over the surface and absorb liquid from the surface. The liquid removal device may include an extractor drum comprising a plurality of openings or slots abutting the absorber drum so that the smooth surface of the extractor drum and/or the plurality of openings or slots press against the absorber drum and squeeze liquid out of the absorbent material and permit the absorbed liquids to drain into the extractor drum or a holding tank through the plurality of openings or slots.

In an embodiment, a liquid removal device includes a chassis, the chassis comprising a handle, an absorber drum rotationally coupled with the chassis, and an extractor drum rotationally coupled with the chassis. The absorber drum comprises a cylinder having an outer drum surface, where an absorbent layer is positioned on the outer drum surface of the absorber drum, the absorber drum configured to absorb a liquid from a surface. The extractor drum comprises a reservoir configured to retain the liquid absorbed from the surface, an outer extractor surface, and a plurality of apertures defined by the outer extractor surface in fluid communication with the reservoir. The extractor drum is movable between a first position and a second position. In the first position, at least a first portion of the plurality of apertures are in contact with the absorbent layer. In the second position, the first portion of the plurality of apertures are not in contact with the absorbent layer.

In an embodiment, a method of removing liquid from a surface comprises moving a liquid removal device over the surface. The liquid removal device comprises an absorber drum and an extractor drum, the extractor drum comprising a reservoir and a plurality of apertures in fluid communication with the reservoir, wherein the absorber drum absorbs the liquid from the surface. The method also includes extracting the liquid from the absorber drum into the reservoir of the extractor drum through at least a first portion of the plurality of apertures.

BRIEF DESCRIPTION OF THE DRAWINGS

The present disclosure will be more readily understood from a detailed description of some example embodiments taken in conjunction with the following figures.

DETAILED DESCRIPTION

Figure 1:
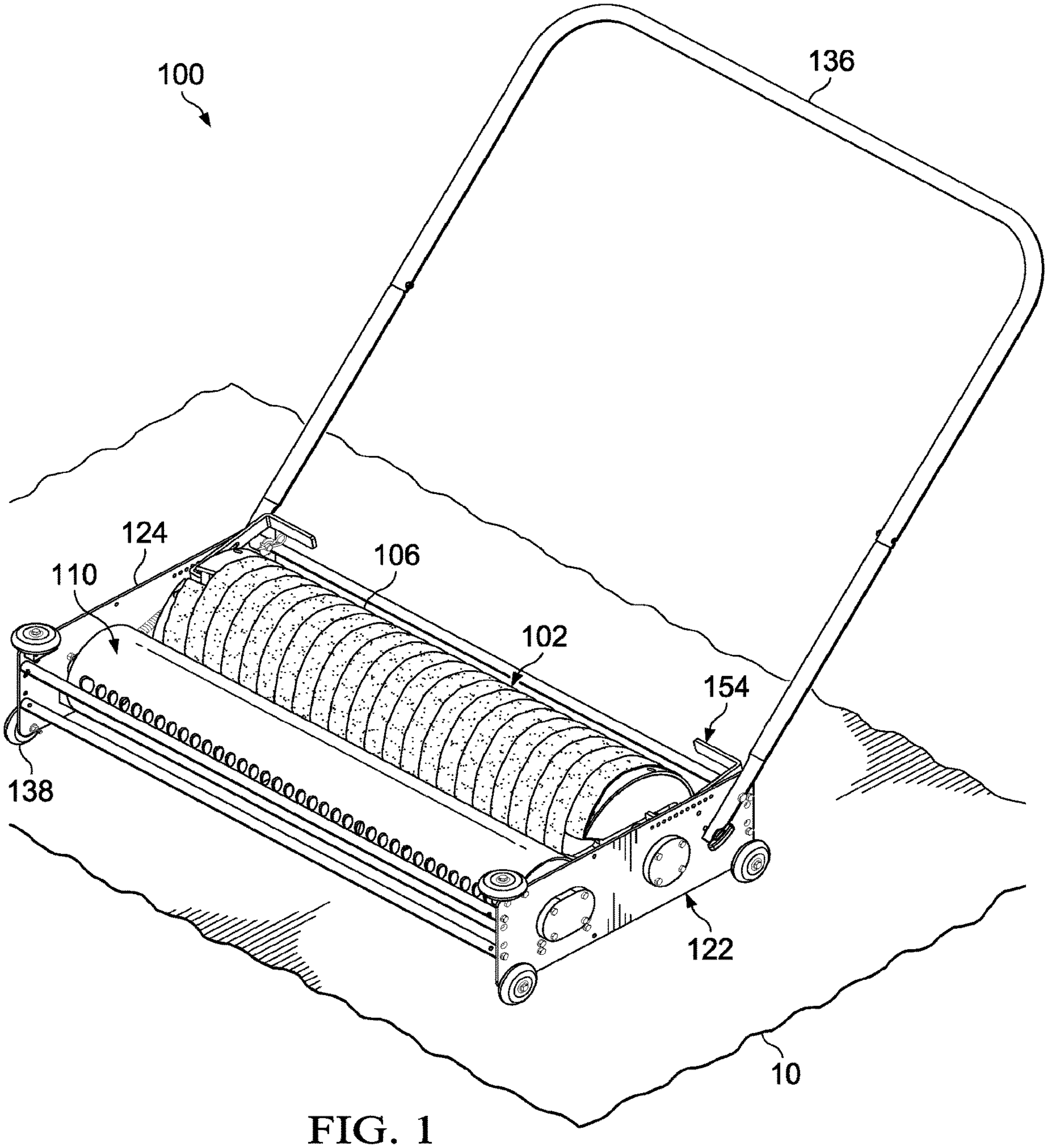
FIG. 1 is a perspective view of an example embodiment of a liquid removal device.

Various non-limiting embodiments of the present disclosure will now be described to provide an overall understanding of the principles of the structure, function, and use of the apparatuses, systems, methods, and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure. Like numbers refer to like elements throughout, and base 100 reference numerals are used to indicate similar elements in alternative embodiments.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Referring to FIGS. 1-9, in an embodiment, a liquid removal device 100 may be used for removing liquids from a surface 10. A liquid removal device may be used to remove water, for example, but may also be used to remove other liquids, such as hazardous liquids (e.g., fuel, oil, liquid chemicals). For instance, the liquid removal device 100 may be used to remove water from athletic courts, such as tennis, pickleball and/or basketball courts, race tracks, construction sites, warehouses, or pool decks and the like. It will be appreciated that the liquid removal device 100 may be useful in other applications.

The liquid removal device 100 shown in FIG. 1 illustratively includes an absorber drum 102 to roll over the surface 10 and absorb liquids from the surface 10. The absorber drum 102 can include a circular cross-section and comprises a tubular frame 104, a liquid absorbing layer 106 carried by an outer radial surface of the tubular frame 104, and an axle 108 (FIG. 2) extending longitudinally and carrying the tubular frame 104. Suitable materials for the tubular frame 104 include, without limitation, a polymer plastic, metal, PVC, or a phenolic tube. Any fluid absorbing material can be used for the liquid absorbing layer appropriate for the particular liquid to be absorbed and the surface on which the liquid exists. In various embodiments, the liquid absorbing layer comprises a foam material, a synthetic fiber material, such as polyester and nylon materials, a microfiber material, a wool material, a wool-poly blend material, or a combination thereof. The absorber drum 102 may have a uniform outer diameter or a variable or patterned surface as appropriate for various applications. The liquid absorbing layer 106 may have uniform layering or may have a variable layering as appropriate for a particular application.

Figure 2:
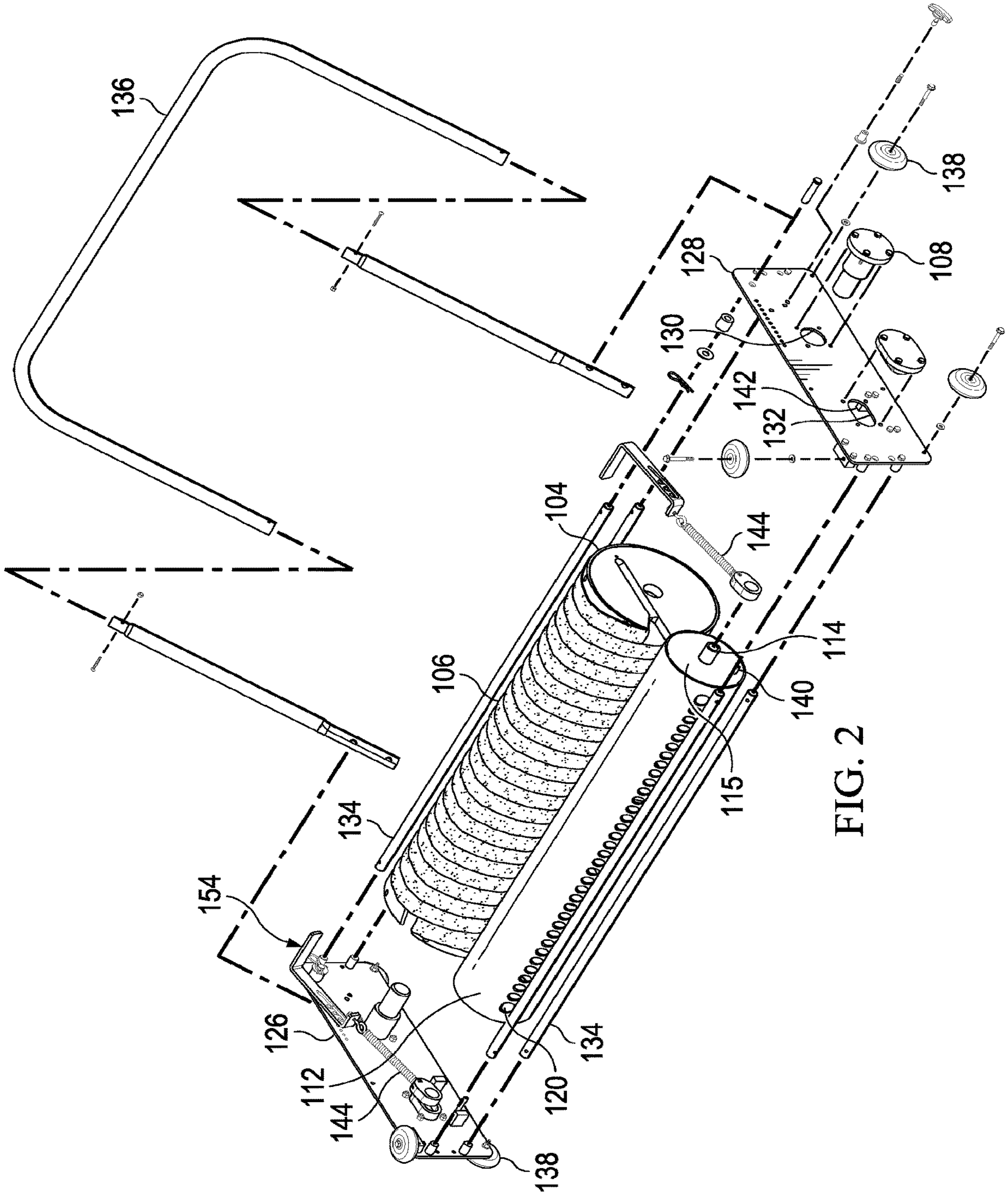
FIG. 2 is an exploded view of the liquid removal device of FIG. 1.

The liquid removal device 100 shown in FIG. 1 includes an extractor drum 110 abutting the absorber drum 102. In the illustrated embodiment, the extractor drum 110 has a circle-shaped cross-section and is hollow. In other embodiments, the extractor drum 110 can have other shapes and abut the absorber drum at any appropriate radial position. The extractor drum 110 may have a circular sidewall 112 and an axle 114 (FIG. 2). In an embodiment, the sidewall 112 may extend between end walls 115, which may have the same or a larger cross-sectional area than the sidewall 112. The end walls 115 could be removable to permit cleaning of the hollow interior, which can collect small debris (e.g., dirt) during use. Suitable materials for the extractor drum 110 may include, without limitation, a polymer plastic material, such as polyvinyl chloride, aluminum, or another material with sufficient rigidness and water, chemical, anti-static, or fuel resistance. The extractor drum 110 can define an interior comprising an extractor drum fluid reservoir 116. The extractor drum fluid reservoir 116 can be liquid tight or otherwise can prevent leakage of accumulated water below a first set of apertures 118 and a second set of apertures 120. The first set of apertures 118 are in alignment and communication with the fluid reservoir 116 of the extractor drum 110 such that fluid can flow through the apertures 118 into the fluid reservoir 116 for storage.

Figure 4:
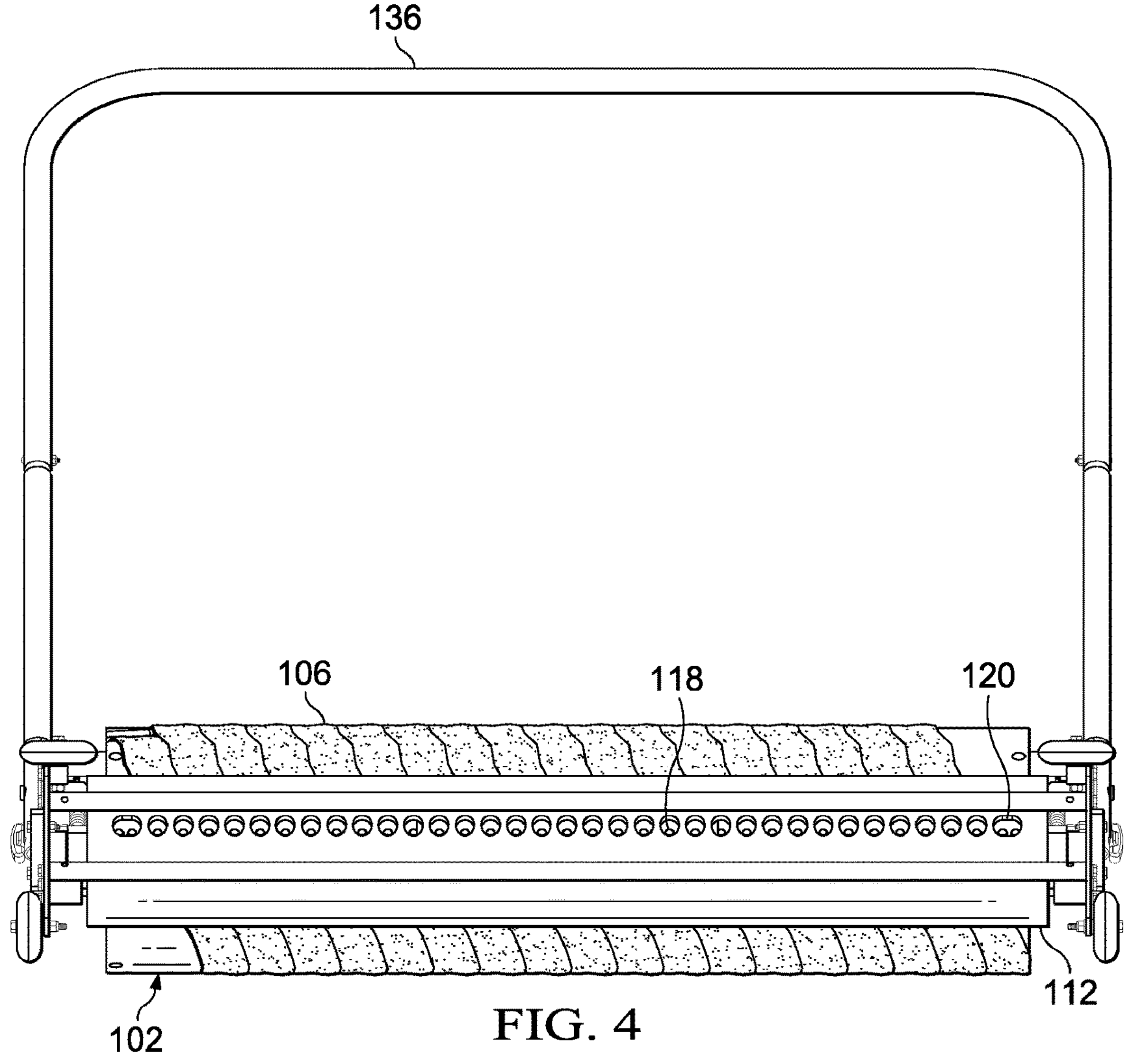
FIG. 4 is a front view of the liquid removal device of FIG. 1.
Figure 5:
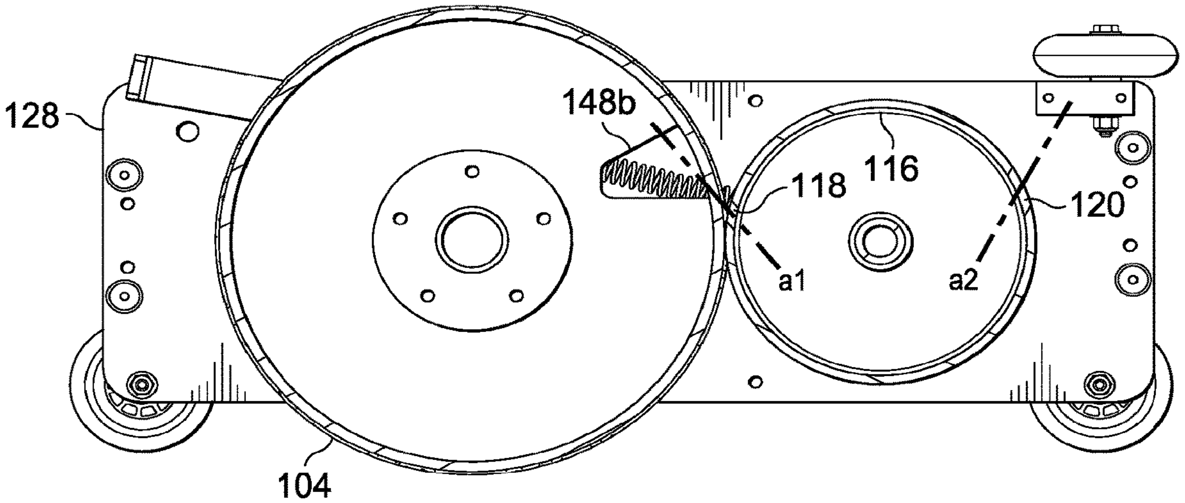
FIG. 5 is a cross-sectional view of the liquid removal device of FIG. 1 in a draining position with the handle removed.

In some embodiments, a second set of apertures 120 may be configured to release the liquid from the interior extractor drum fluid reservoir 116 of the extractor drum 110. While the illustrated embodiment includes two sets of apertures 118, 120, the technology is not so limited. The shape, size, and/or number of the apertures 118, 120 may vary. For example, the shape, size, and/or number of apertures may vary between the sets of apertures. In an embodiment, the apertures may be arranged linearly (as shown in FIG. 4) or in adjacent staggered lines. For example, each set of the plurality of apertures may include a linear orientation of apertures, spaced apart apertures, offset apertures, or any other configuration. Each of the apertures may be circular, hemispherical, polygonal, or any other suitable shape. Apertures may be openings of any shape, size, or dimension within the extractor drum and can be suitably positioned in reference to the absorber drum 102. In an embodiment, each of the sets of apertures 118, 120 may be in a different radial quadrant of the extractor drum, such as in opposite radial quadrants.

As shown in FIGS. 1 and 2, the liquid removal device 100 illustratively comprises a chassis 122 retaining the axle 108 of the absorber drum 102 and the axle 114 of the extractor drum 110. The chassis 122 may include a housing 124, which may include for example two side supports 126, 128 bracketing the ends of the axles. The axles may be rotationally coupled to the side supports 126, 128 in any suitable manner. For example, the side supports 126, 128 may include openings 130, 132 for the axle 108 of the absorber drum 102 and the axle 114 of the extractor drum 110. The opening 132 for the extractor drum axle 114 can allow for relative movement between the axle 114 and the chassis 122. For example, the opening 132 may be oval shaped to allow displacement of the extractor drum 110 in the event of debris encountering the abutted drums for passing purposes to prevent absorber drum 102 from rotationally locking. In an embodiment, the chassis 122 includes a plurality of support beams 134 coupling the side supports 126, 128. The outer diameter of the absorber drum 102 can extend a distance below the chassis 122 such that the liquid absorbing layer 106 of the absorber drum 102 contacts and can roll along the ground or other surface. The absorber drum 102 can function as a cylindrical wheel allowing repositioning of the liquid removal device 100 on desirable surfaces. It should be appreciated that the housing 124 may further enclose the device components for aesthetic or protection reasons. For example, the housing 124 may also include a cover (not shown) that encloses the absorber drum 102 and extractor drums 110, as well as other components, for aesthetic and protection from natural elements, such as sun exposure damage. The housing or cover can be modified to hold additional tools, such as a broom or squeegee, can include signage such as digital signage, and can be used to support solar panels for a motorized unit.

The liquid removal device 100 illustratively comprises a handle 136 coupled to the chassis 122 for manipulation by a user. As will be appreciated, the user pushes the liquid removal device 100 along the surface using the handle 136 keeping the absorber drum 102 in contact with the liquid-covered surface to remove liquid from the surface. Other forms of operation, such as motorized or autonomous operation, are contemplated.

An outer surface of the sidewall 112 may function as a wheel to rotate the extractor drum 110 where operationally beneficial but not for transport or repositioning. The outer surface of the sidewalls may have, for example, a urethane coating or another coating with a higher coefficient of friction than the material of the sidewalls. In some embodiments, the extractor drum 110 may include wheels 138. The liquid removal device 100 illustratively comprises four wheels 138 coupled to a lowermost portion of the chassis 122 at diagonal ends thereof for permitting the liquid removal device 100 to be transported over surfaces not requiring drying and to overcome obstacles such as curbs or sidewalks. In an embodiment, the liquid removal device 100 will operate on the absorber drum 102 when liquid pickup is desired, where rear wheels 138 can be engaged to turn 180 degrees to begin the next swath of drying. Front wheels 138 can be provided to overcome an obstacle such as a curb when transporting the device. It will be appreciated that the wheels 138 or other stabilization features can contact the ground or surface while the device is being used to absorb fluid from the surface. When removing liquid from a surface, the wheels 138 may be held apart from the surface during the extraction phase. To engage the wheels 138, the handle 136 may be lifted or tilted such that the wheels 138 contact the surface or ground. Moving the liquid removal device 100 while in this lifted, wheel-engaged position will rotate the wheels 138 and, thus, the extractor drum 110 from a first, onboarding position to a second, draining position. In the first onboarding position, the first set of apertures 118 (FIGS. 4 and 6) are adjacent to the absorber drum 102, and the second set of apertures 120 are opposite the first set of apertures 118 and parallel to the ground. In this configuration, liquid in the extractor drum fluid reservoir 116 will not drain out of the second set of apertures 120. In the second, draining position, the second set of apertures 120 can be rotated such that they are facing generally downward towards the surface or ground. In this configuration, liquid may automatically drain out of the extractor drum fluid reservoir 116 through the second set of apertures 120 due to gravity. Additionally, the user may lift or lower the handle 136 to engage either the front or rear transport wheels 138 to transport the device over surfaces not in need of drying. It may be of use to allow "feeler" wheels to be affixed to the liquid removal device 100 to assist with handle 136 stability during operation.

In some embodiments, the extractor drum 110 will not include wheels, and the outer surface of the sidewalls 112 will not extend beyond the diameter of the extractor drum 110 body itself. After liquid is onboarded and draining is required, the handle 136 can be pulled backwards toward the user to cause the absorber drum 102 to rotate opposite its typical onboarding rotation. By causing the absorber drum 102 to rotate in the opposite direction, by virtue of the coefficient of friction between the absorber drum 102 liquid absorbing layer 106 and the extractor drum 110, the extractor drum 110 will be rotated from the onboarding position to the drain position until extractor rotation limiter pin 140 (FIG. 2), engages the extractor rotation limiter drain stop 142 (FIG. 2). In an embodiment, both ends of the drum 110 may include a pin 140 and stop 142. As the extractor drum 110 is rotated to the drain position, liquid is then allowed to escape out of the second set of apertures 120 which have been rotated to face downward towards the surface or ground.

To ensure proper placement of the extractor drum 110, the liquid removal device 100 illustratively comprises at least one elastic device 144 (e.g., a coil spring, rubber bands, a bungie cord, or any suitable tension creating implement) coupled between the extractor drum 110 and the chassis 122. The elastic device 144 can be configured to urge the absorber drum 102 and the extractor drum 110 into contact with one another with enough of a coefficient of friction to pull water from the absorber drum 102 into the extractor drum 110. Additionally, if the absorber drum 102 picks up debris larger than the first set of apertures 118 from the surface 10, such as rocks, twigs, tanbark, leaves, debris and the like, the elastic device 144 may permit the extractor drum 110 to be displaced slightly such that the debris falls away from the device or for easy manual access and removal by the user. In some embodiments it can be envisioned to institute a cleaning apparatus that would assist with an automated removal and capture of debris as the embodiment is rolled across the surface to keep the liquid absorbing material clean. The elastic device, in one version, can be connected to a slip bushing of low coefficient of friction material which surrounds the extractor drum axle or absorber drum axle, which is also made of a material with low coefficient of friction material. This configuration can function as a bearing and allows high elastic tension force to be applied to the extractor drum axle or absorber drum axle, and yet still let the extractor drum rotate to and from onboarding and draining positions.

Figure 6:
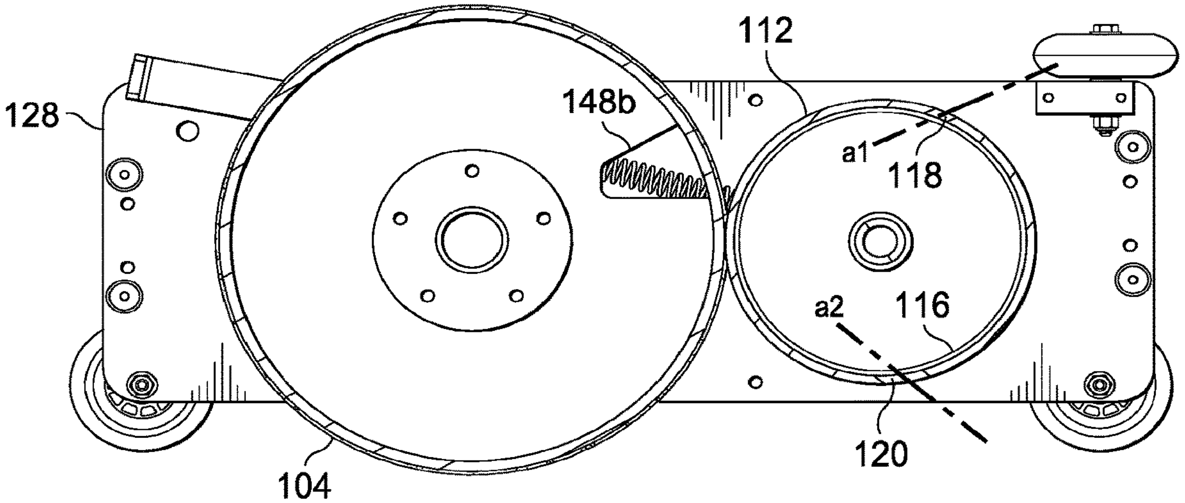
FIG. 6 is a cross-sectional view of the liquid removal device of FIG. 1 in an onboarding position with the handle removed.

In various embodiments, the extractor drum 110 may be movable between a first, onboarding position (FIG. 5) and a second, draining position (FIG. 6). In the first, onboarding position, the first set of apertures 118 (axis a1) is adjacent to the absorber drum 102, and the second set of apertures 120 (axis a2) are facing away from the surface. In other words, liquid in the extractor drum fluid reservoir 116 will not drain out of the second set of apertures 120 due to gravity in the first, onboarding position (unless the level of the liquid rises above the apertures 118 or 120). For example, liquid in the lower half of the reservoir 116 will not drain out of the reservoir through the apertures 120. In the second, draining position, the second set of apertures 120 are lower towards the surface relative to the first position, and liquid may automatically drain out of the extractor drum fluid reservoir 116 through the second set of apertures 120 (e.g., due to gravity). In an embodiment, the liquid removal device 100 may be configured to move the extractor drum 110 to the draining position by moving the liquid removal device 100 backwards on the surface. The rotation of the extractor drum 110 to and from onboarding and draining positions occurs easily and naturally due to the rotational direction of the absorber drum 102. When the liquid removal device 100 is pushed forward by the handle, the extractor drum 110 is rotated to the onboarding position by the coefficient of friction between the absorber drum liquid absorbing layer 106 and the extractor drum 110 because of the force imparted by the elastic devices pressing the extractor drum into the liquid absorbing layer 106, and until the extractor rotation limiter pin reaches the extractor rotation limiter onboarding stop block.

When the liquid removal device is pulled backwards by the handle, the extractor drum 110 rotates to the drain position due to the coefficient of friction between the absorber drum liquid absorbing layer 106 and the extractor drum 110 because of the force imparted by the elastic devices pressing the extractor drum into the liquid absorbing layer 106, and until the extractor rotation limiter pin reaches the extractor rotation limiter drain stop block. For example, when moving the liquid removal device 100 backwards, the extractor drum 110 may be rotated by the friction between it and the absorber drum 102 such that the liquid drains out of the extractor drum fluid reservoir 116. The distance the liquid removal device 100 travels backwards to move the extractor drum 110 to the draining position may vary. In various embodiments, the distance may be in a range of 0.1 to 20 inches, 1 to 10 inches, 1 to 5 inches, or 5 to 10 inches. In some embodiments, the liquid removal device 100 may include a selectively engageable safety mechanism to prevent unintentionally moving the extractor drum 110 to the draining position. For example, a trigger for the safety mechanism may be positioned on the handle. When engaged, the safety mechanism may prevent backward movement of the liquid removal device 100 from rotating the extractor drum 110. When disengaged, the safety mechanism may allow backward movement of the liquid removal device 100 to rotate the extractor drum 110. The user may disengage the safety mechanism when ready to drain the liquid from the extractor drum 110.

In use, when pushing the liquid removal device 100 along a surface to remove liquid, the absorber drum 102 rotates to pick up fluid from the surface. In one embodiment, the extractor drum fluid reservoir 116 remains rotationally stationary and accepts the fluid from the absorber drum 102 via the first set of apertures 118. The extractor drum fluid reservoir 116 can be prevented from rotating by the extractor rotation limiter pin 140 engaged with the stop 142. At least a portion or all of the first set of apertures 118 can abut or otherwise engage the rotating absorber drum 102 at the tangent or point of engagement between the absorber drum and the extractor drum. As the absorber drum 102 rotates, the liquid absorbing layer 106 can be urged against the outer surface of the extractor drum 110 by force exerted by the elastic device 144. The force exerted by the elastic device 144 presses or squeezes the liquid absorbing layer 106 coaxing the liquid out of the liquid absorbing layer 106 and into the properly aligned first set of apertures 118 such that the liquid then collects in the extractor drum fluid reservoir 116. The location of the interface between the absorber drum 102 and the extractor drum 110 may vary. For example, in the illustrated embodiment, the extractor drum 110 abuts the absorber drum 102 at a front radial position. It may be appreciated that the location of the interface may be adjusted by use case where operationally beneficial.

To drain liquid from the extractor drum fluid reservoir 116, the user pulls the handle 136 backward to rotate the absorber drum 102 clockwise and opposite that of the typical onboarding rotation direction. The action of rotating the absorber drum 102 backwards can correspondingly rotate the extractor drum 110 in a counterclockwise direction until it reaches a rotational stop caused by the extractor rotation limiter pin 140 engaging extractor rotation limiter drain stop 142. The extractor drum 110, rotating opposite of the absorber drum 102, can also move the second set of apertures 120 such that they are rotated to point towards the ground. When the second set of apertures 120 are so situated, the liquid stored in the extractor drum fluid reservoir 116 is allowed to escape and to be drained by way of gravity and liquid momentum. After draining is complete, the handle 136 is then pushed in the forward direction away from the user, and the system will return to the water onboarding configuration as described herein. It will be appreciated that a safety mechanism, as described herein, may be associated with the extractor drum 110 or liquid removal device 100 to prevent the draining of fluid in the reverse direction until desired by the operator.

Figure 3:
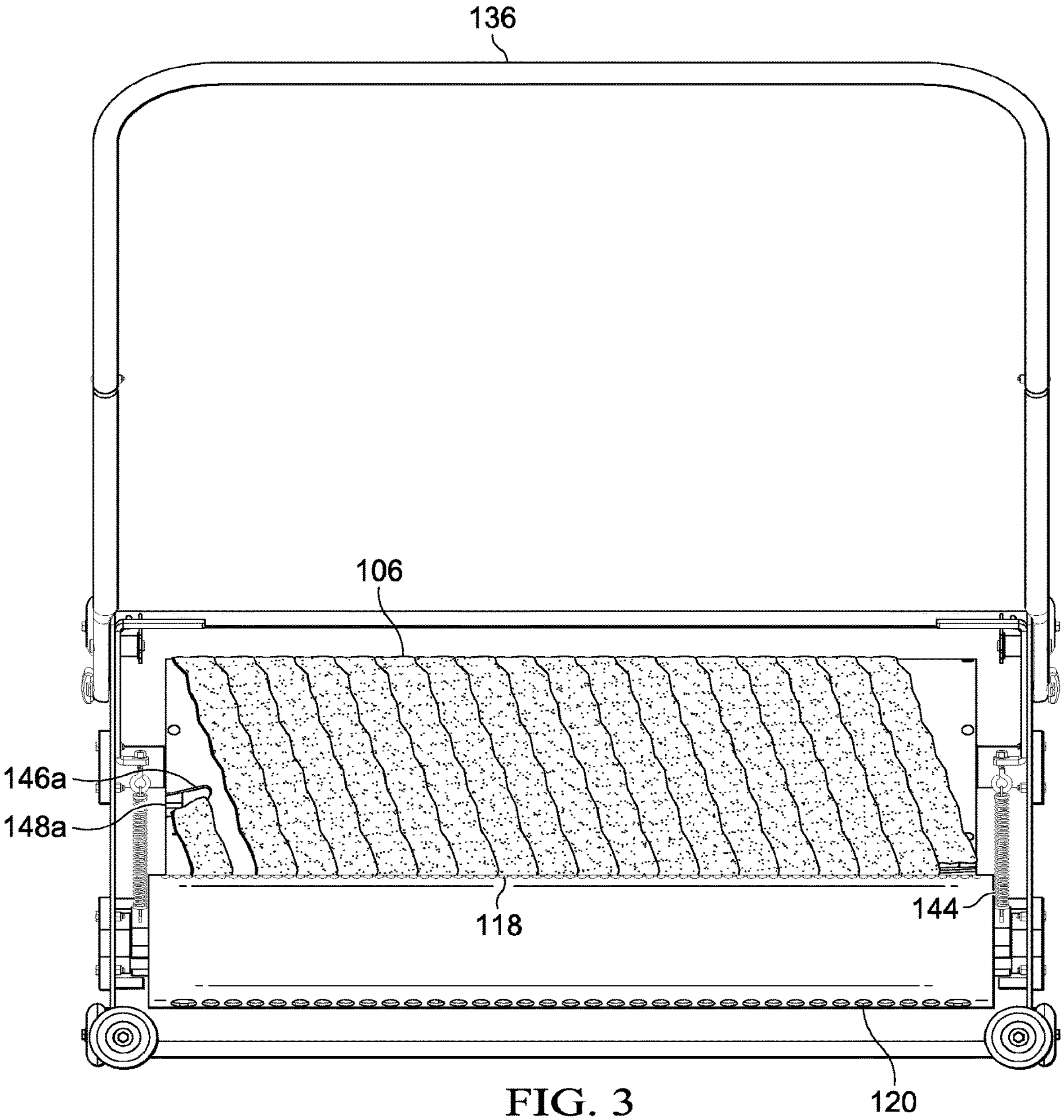
FIG. 3 is a top view of the liquid removal device of FIG. 1.
Figure 7:
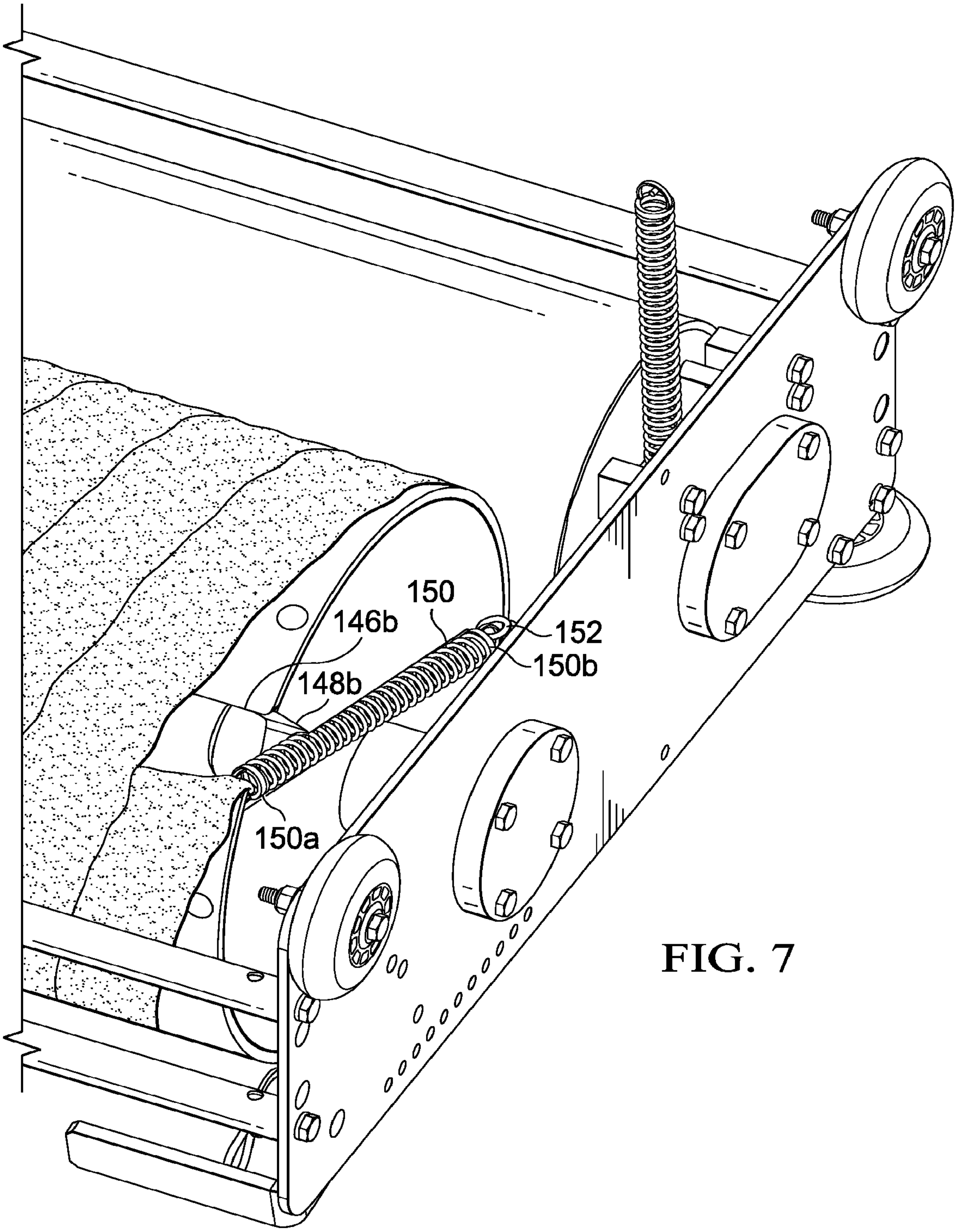
FIG. 7 is a bottom view of the automatic tensioning mechanism of the liquid removal device of FIG. 1.

Depending on the application and material used for the liquid absorbing layer, the liquid absorbing layer may stretch during use. For example, the extractor drum pressing against the absorber drum may cause the liquid absorbing layer to stretch and become loose in places. In some embodiments, the liquid removal device may be configured to maintain tension on the liquid absorbing layer during use. Referring to FIGS. 3 and 7, the liquid absorbing layer 106 may be wound on the absorber drum 102. The absorber drum 102 may include including a dynamic tensioning mechanism for maintaining tension on and preventing loosening of the liquid absorbing layer 106.

As shown in FIG. 7, the dynamic tensioning mechanism may include a spring or other tensioning device, as described further below. In the illustrated embodiment, a first end 106*a* of the liquid absorbing layer 106 may be anchored to a first end 102*a* of the absorber drum 102, and a second end 106*b* of the liquid absorbing layer 106 may be coupled to a second end 102*b* of the absorber drum 102 under tension. The absorber drum 102 may be configured so that the connections of the first and second ends 106*a*, 106*b* of the liquid absorbing layer 106 are radially inward of the outer radial surface. In such a configuration, the first and second ends 106*a*, 106*b* and the components connecting them to the absorber drum 102 do not contact the surface (e.g., a court) during operation of the liquid removal device 100. For example, the sidewall 112 of the absorber drum 102 may include cutouts 146*a*, 146*b*. The first and second end walls 115*a*, 115*b* of the extractor drum 110 may include corresponding cutouts 148*a*, 148*b* that open to the cutouts 146*a*, 146*b* (FIGS. 3 and 7). The first end 106*a* of the liquid absorbing layer 106 and the first end 102*a* of the absorber drum 102 may include corresponding connectors. For example, the first end 106*a* of the liquid absorbing layer 106 may include a grommet that may be removable coupled to a pin positioned in the cutout 148*a*. The first end 106*a* of the liquid absorbing layer 106 may extend through the cutout 146*a* and into the cutout 148*a* to be coupled to the pin.

Referring to FIG. 7, in an embodiment, the second end 106*b* of the liquid absorbing layer 106 may be removably coupled to the second end 102*b* of the absorber drum 102 using a spring 150. The spring 150 dynamically tensions the liquid absorbing layer 106. The spring 150 may be removably coupled to at least one of the second end 106*b* of the liquid absorbing layer 106 and the absorber drum 102. In an example, the second end 106*b* of the liquid absorbing layer 106 may include a connector, such as a grommet, which may be selectively coupled to a first end 150*a* of the spring 150. The second end 150*b* of the spring 150 may be coupled to the absorber drum 102. For example, the end wall 115*b* of the absorber drum 102 may include a connection point, such as a hook 152 that may be selectively coupled to a second end 150*b* of the spring 150. The liquid absorbing layer 106 is wound or wrapped on the absorber drum 102 such that pressure applied by the extractor drum 110 is distributed towards the second end 106*b* of the liquid absorbing layer 106. In other words, if the material stretches, it stretches in a direction towards the spring 150. The spring 150, which applies tension to the second end 106*b* of the liquid absorbing layer 106, is able to compensate if the material stretches.

In use, when rolling the liquid removal device 100 along a surface to remove liquid, the absorber drum 102 rotates while the extractor drum 110 is rotationally stationary. As the absorber drum 102 rotates, the liquid absorbing layer 106 is pressed against the extractor drum 110. If the liquid absorbing layer 106 stretches, the rotary motion "pushes" the material in a corkscrew motion from the anchored end to the tensioned end. Because the second end of the material is under dynamic tension, the stretching of the material does not result in a loosening of the material.

Figure 8:
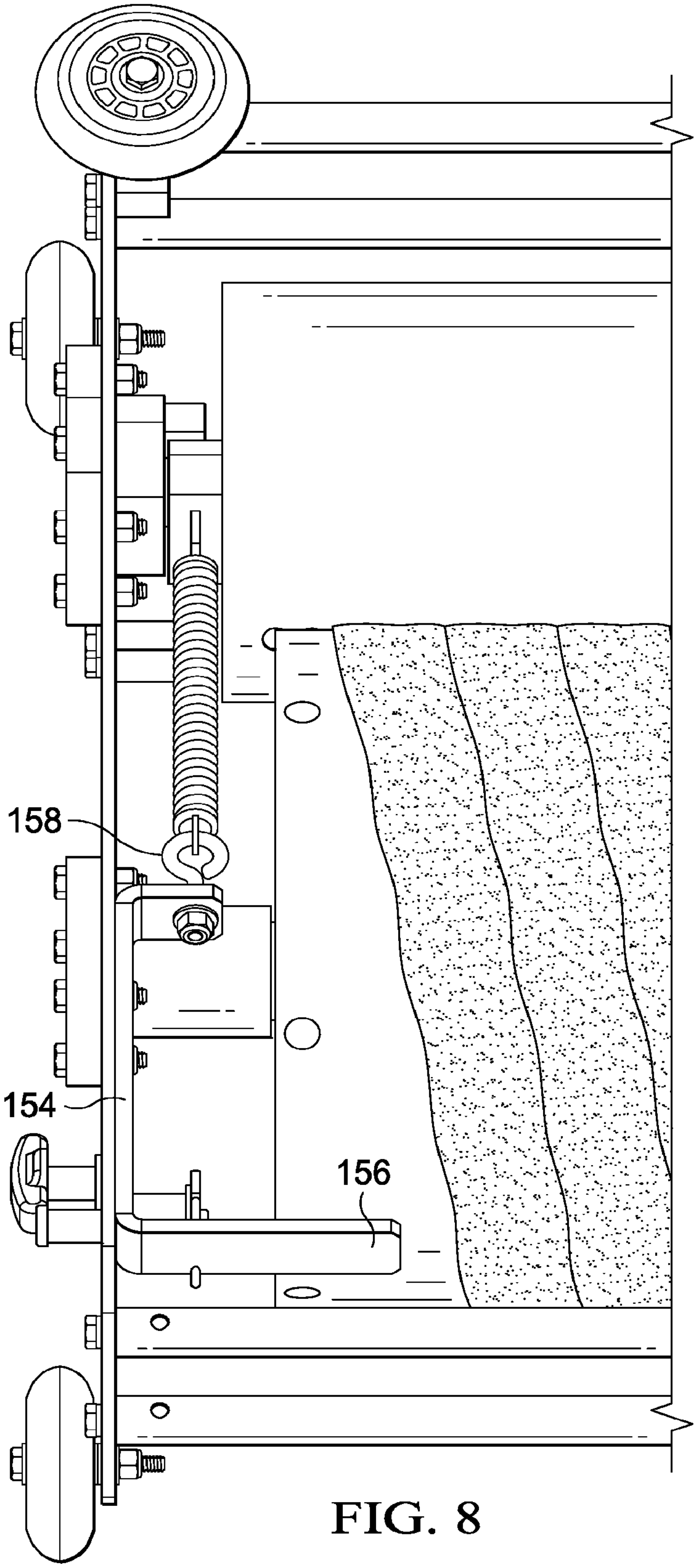
FIG. 8 is a rear perspective view of the adjustable bracket of the liquid removal device of FIG. 1 with the handle removed.
Figure 9:
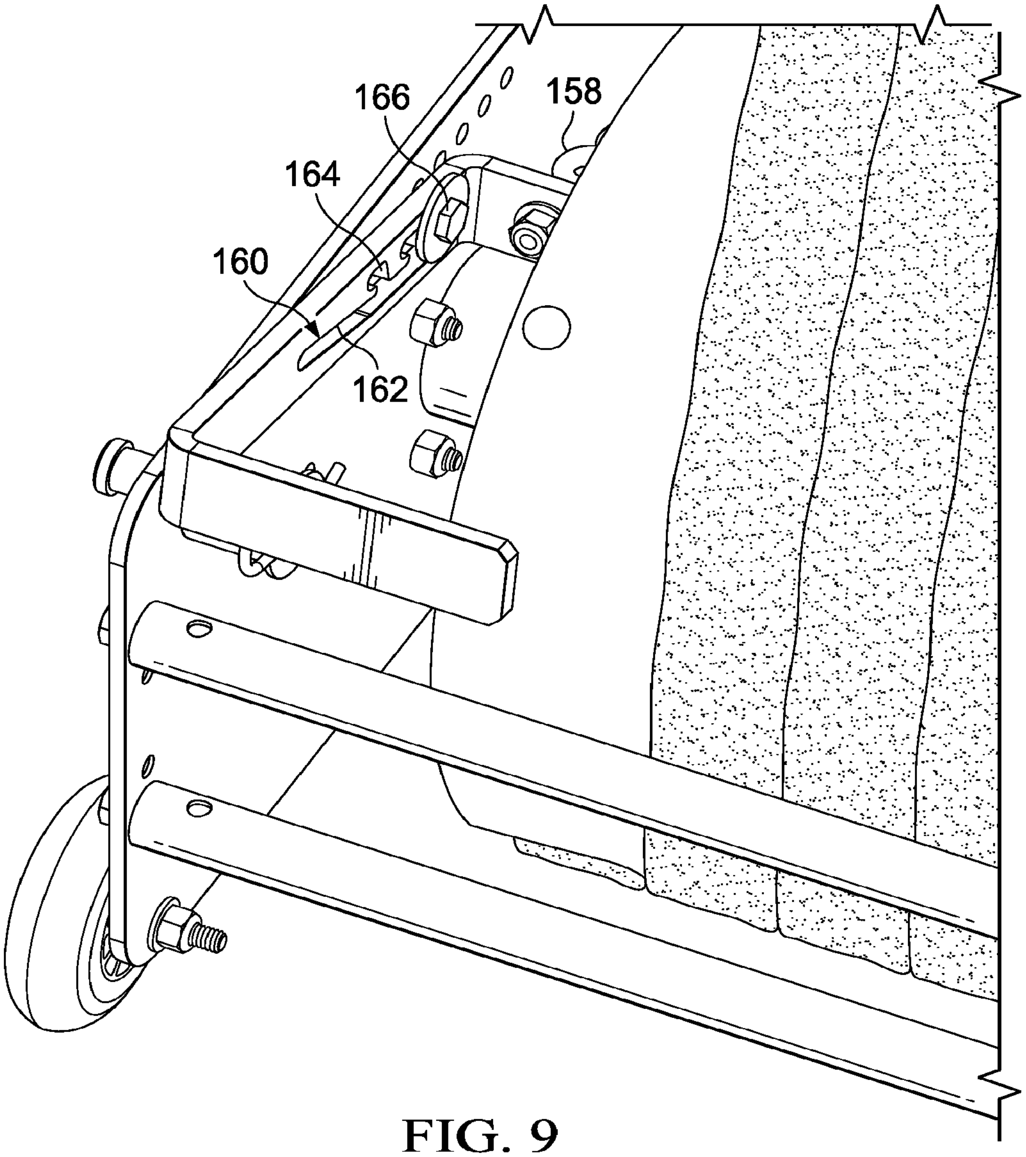
FIG. 9 is a perspective view of the adjustable bracket of the liquid removal device of FIG. 1 with the handle removed.

In some embodiments, the tension or strain of the coil spring 144, or other elastic device, may be adjustable. Having an adjustable tension may allow for separating the absorber drum 102 and the extractor drum 110 without uncoupling the coil spring 144. With reference to FIGS. 8 and 9, in another embodiment, the liquid removal device 100 includes an adjustable bracket 154 for adjusting tension on the coil spring 144. The bracket 154 is movably coupled to the chassis 122 and defines a handle 156. The bracket 154 may be coupled to the coil spring 144. For example, the coil spring 144 may be removably coupled to the bracket 154 using an eyelet hook 158. The bracket 154 may have a cutout 160. The cutout 160 may define a channel 162 opening to one or more indentations or notches 164 configured to receive a pin or fastener, such as bolt 166. In an embodiment, the bolt 166 may couple the chassis 122 and the bracket 154. The bracket 154 may have at least two locked positions relative to the chassis 122. Each indentation or notch 164 defines a position for the bracket 154. For example, when the bracket 154 is in a first locked position, the coil spring 144 may be tensioned such that the extractor drum 110 is in contact with the absorber drum 102. When the bracket 154 is in a second locked position, the coil spring 144 may have a lower tension such that the extractor drum 110 is spaced apart from the absorber drum 102. To move between the locked positions, the bracket 154 may be moved such that the bolt 166 slides out of one of the notches 164, moves forward or backward in the channel 162, and moves into another of the notches 164. The channel 162 may extend beyond the notches 164 and may allow for the bracket 154 to be moved to a configuration in which the coil spring 144 is not under tension. There may be more than two locked positions. For example, multiple locked positions may allow for the extractor drum 110 to be pressed against the absorber drum 102 at different tensions. Adjusting the force that the extractor drum 110 exerts on the absorber drum 102 results in a different amount of force required to operate the liquid removal device 100. Thus, the force required to operate the liquid removal device 100 may be adjusted based on the application or user preferences In some embodiments, the user may move one or both of the extractor drum 110 and the absorber drum 102 to be in a spaced apart configuration to allow a user to remove the liquid absorbing layer 106 (e.g., to replace old material). For example, the user may use the adjustable bracket 154 to move the extractor drum 110 away from the absorber drum 102. The liquid absorbing layer 106 may then be detached and unspooled from the absorber drum 102. A new liquid absorbing layer 106 may then be installed on the absorber drum 102.

Advantageously, the liquid removal devices disclosed herein provide an effective and robust approach to liquid removal. It will be appreciated that the width of the liquid removal devices described herein may vary. In some embodiments, the width of the liquid removal device may be in a range from 1 ft. to 10 ft., from 2 ft. to 4 ft., from 6 in. to 12 in., or have any other suitable dimensions.

It is contemplated that liquid removal devices described herein may be used to apply or deliver a fluid or material in addition to, or separate from, a fluid absorbing function. For example, devices can be modified to deliver a surface coating such as a top coat, sealer, or varnish. Liquid removal devices may be manually pushed, motorized, remote controlled, autonomous, or can be capable of operating in any modes.

In various embodiments disclosed herein, a single component can be replaced by multiple components and multiple components can be replaced by a single component to perform a given function or functions. Except where such substitution would not be operative, such substitution is within the intended scope of the embodiments.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

What is claimed is:

1. A liquid removal device, the liquid removal device comprising:

a housing;

an absorber drum, the absorber drum coupled with the housing at a first end and second end such that the absorber drum is rotatable relative to the housing, wherein the absorber drum is configured to absorb a liquid from a surface;

an extractor, the extractor coupled with the housing, wherein the extractor is configured to extract the liquid absorbed by the absorber drum from the absorber drum; and a reservoir, the reservoir being associated with the housing, wherein the reservoir is configured to receive and retain the liquid extracted from the absorber drum by the extractor.

2. The liquid removal device of claim 1, wherein the housing defines an interior, wherein the absorber drum, the extractor, and the reservoir are positioned in the interior of the housing.

3. The liquid removal device of claim 1, wherein the absorber drum comprises an absorbent layer.

4. The liquid removal device of claim 3, wherein the absorbent layer is selectively removable from the absorber drum.

5. The liquid removal device of claim 3, wherein the absorbent layer includes a first end and a second end and is coupled with the first end and second end of the absorber drum, respectively, in a helical configuration.

6. The liquid removal device of claim 3, further comprising a tension mechanism coupling the absorbent layer to the absorber drum.

7. The liquid removal device of claim 1, wherein the housing further comprises a handle.

8. A liquid removal device, the liquid removal device comprising:

a housing;

a rotating member, the rotating member coupled with the housing at a first end and second end such that the rotating member is rotatable relative to the housing;

a fabric layer, the fabric layer being coupled with the rotating member, wherein the fabric layer is configured to absorb a liquid;

an extractor, the extractor coupled with the housing, wherein the extractor is configured to extract the liquid absorbed by the fabric layer from the fabric layer; and a reservoir, the reservoir being associated with the housing, wherein the reservoir is configured to receive and retain the liquid extracted from fabric layer by the extractor.

9. The liquid removal device of claim 8, wherein the fabric layer is selectively removable from the rotating member.

10. The liquid removal device of claim 9, further comprising a tension mechanism coupling the fabric layer to the rotating member.

11. The liquid removal device of claim 8, wherein the housing further comprises a handle.

12. The liquid removal device of claim 8, wherein the rotating member has a cylindrical configuration.

13. A method of using a liquid removal device comprising:

providing a liquid removal device comprising;

a housing;

an absorber drum, the absorber drum coupled with the housing at a first end and second end such that the absorber drum is rotatable relative to the housing, wherein the absorber drum is configured to absorb a liquid from a surface;

an extractor, the extractor coupled with the housing, wherein the extractor is configured to extract the liquid absorbed by the absorber drum from the absorber drum; and a reservoir, the reservoir being associated with the housing, wherein the reservoir is configured to receive and retain the liquid extracted from the absorber drum by the extractor; and absorbing the liquid from the surface by moving the absorber drum over the surface; and extracting the liquid from the absorbent layer by the extractor into the reservoir.

14. The method of claim 13, further comprising draining the liquid from the reservoir.

15. The method of claim 13, wherein draining the liquid from the reservoir comprises moving the reservoir from a first position to a second position such that the liquid will be urged out of the reservoir.

16. The method of claim 15, wherein absorbing the liquid from the surface is achieved by moving the housing in first direction and draining the liquid from the reservoir is achieved by moving the housing in an opposite second direction.

17. The method of claim 13, wherein the liquid removal device further comprises an absorbent layer detachably coupled with the absorber drum.

18. The method of claim 17, wherein the absorbent layer is a fabric layer.

19. The method of claim 17, wherein the absorbent layer is coupled with the absorber drum in a helical configuration.

20. The method of claim 17, wherein a tension mechanism detachably couples the fabric layer to the absorber drum.

* * * * *